(12) United States Patent
Jagger et al.

(10) Patent No.: US 7,007,302 B1
(45) Date of Patent: Feb. 28, 2006

(54) EFFICIENT MANAGEMENT AND BLOCKING OF MALICIOUS CODE AND HACKING ATTEMPTS IN A NETWORK ENVIRONMENT

(75) Inventors: Luke D. Jagger, Aylesbury (GB); Anton C. Rothwell, Aylesbury (GB); William R. Dennis, Aylesbury (GB)

(73) Assignee: McAfee, Inc., Santa Clara, CA (US)

( * ) Notice: Subject to any disclaimer, the term of this patent is extended or adjusted under 35 U.S.C. 154(b) by 752 days.

(21) Appl. No.: 09/944,869

(22) Filed: Aug. 31, 2001

(51) Int. Cl.
*G06F 17/00* (2006.01)
(52) U.S. Cl. .............................. 726/25; 726/23; 726/27
(58) Field of Classification Search ................ 713/340, 713/150–155; 726/23–27
See application file for complete search history.

(56) References Cited

U.S. PATENT DOCUMENTS 5,511,163 A    4/1996    Lerche et al. .......... 398/183.04
6,088,804 A    7/2000    Hill et al. .................... 713/201

OTHER PUBLICATIONS http://www-cgi.cnn.com/TECH/computing/9907/21/badrap.idg/.*

Towards a testbed for malicious code detection; Lo, R.; Kerchen, P.; Crawford, R.; Ho, W.; Crossley. J.; Fink, G.; Levitt, K.; Olsson, R.; Archer, M.; Compcon Spring '91. Digest of Papers Feb. 25-Mar. 1, 1991 Page(s): 160-166.*
Instant messaging: a new target for hackers; Leavitt, N.; Computer (IEEE) vol. 38, Issue 7, Jul. 2005 Page(s):20-23.*
Runtime execution monitoring (REM) to detect and prevent malicious code execution;Fiskiran, A.M.; Lee, R.B.; Computer Design: VLSI in Computers and Processors, 2004. ICCD 2004. Proceedings. IEEE International Conference on Oct. 11-13, 2004 Page(s):452-457.*

* cited by examiner

*Primary Examiner*—David Jung
(74) *Attorney, Agent, or Firm*—Zilka-Kotab, PC; Christopher J. Hamaty

(57) ABSTRACT

A system, method and computer program product are provided for preventing an outbreak of malicious code. First, malicious code is identified at a local location on a network. Information relating to the malicious code such as type, context, protocol, severity, reporting server, and IP address, is encrypted at the local location. The encrypted information relating to the malicious code is sent to a plurality of remote locations utilizing the network. Instances of the malicious code are blocked at the remote locations for a predetermined amount of time based on the information.

21 Claims, 8 Drawing Sheets

400

| | |
|---|---|
| Type | Type of attach (ie DoS attack, SPAM-Relay attempt) |
| Context | Traits of the attack. Eg: for a virus outbreak, this could be virus name. For a SPAM attempt, this could be subject, mail headers, magic number for the message, etc. |
| Protocol | Protocol on which attack is taking place (ie SMTP, NNTP, FTP etc) |
| Severity | Severity level of attack |
| ReportingIP | Server reporting attack. (Omitted when tip-off is relayed onward from hub, to protect clients). |
| ReportingFQDN | Domain of server reporting attack (same restrictions as above). |
| SourceIP | IP address at source of attack. |

Figure 4

EFFICIENT MANAGEMENT AND BLOCKING OF MALICIOUS CODE AND HACKING ATTEMPTS IN A NETWORK ENVIRONMENT

FIELD OF THE INVENTION

The present invention relates to system security, and more particularly to network-based management and blocking of malicious computer code and hacking attempts.

BACKGROUND OF THE INVENTION

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is an on-going, ever changing, and increasingly complex problem.

Computer network attacks can take many forms and any one attack may include many security events of different types. Security events are anomalous network conditions each of which may cause an anti-security effect to a computer network. Security events include stealing confidential or private information; producing network damage through mechanisms such as viruses, worms, or Trojan horses; overwhelming the network's capability in order to cause denial of service, and so forth.

Security systems often employ security risk-management tools, i.e. "scanners," to search for known types of security events in the form of malicious programs such as viruses, worms, and Trojan horses. Further, [0] scanners are used for content filtering to enforce an organization's operational policies, i.e. detecting harassing or pornographic content, junk e-mails, misinformation (virus hoaxes), etc.

In most security systems, data is scanned at each entry point into a system. However, in such systems, no communication takes place between the various entry points when a security event occurs. At most, the event is logged in some central database. Thus, an attack that breaches one entry point would also be able to breach all entry points (assuming the same scanning techniques are employed at each point), and can infect any other machine on the network. What is needed is collaboration between network resources so that a resource being attacked can transmit information about the attack to other resources for containing the outbreak and preventing similar attacks at other points in the network.

DISCLOSURE OF THE INVENTION

A system, method and computer program product are provided for preventing an outbreak of malicious code. First, malicious code is identified at a local location on a network. Information relating to the malicious code such as type, context, protocol, severity, reporting server, and IP address, is encrypted at the local location. The encrypted information relating to the malicious code is sent to a plurality of remote locations utilizing the network. Instances of the malicious code are blocked at the remote locations for a predetermined amount of time based on the information.

In one aspect, the malicious code includes a virus, worm, and/or Trojan in the form of a file. Upon detection of this data as infected, files of this same name and/or checksum are blocked at the remote locations for the predetermined amount of time. Communications originating at the identified source can be denied access to the remote locations for the predetermined amount of time. The name and/or checksum can be registered as a known threat. In another aspect, the threat is recognized based at least in part on recognizing that the name of the file is registered as a known threat.

In a further aspect, countermeasures are executed for limiting the effect of the malicious code at the local location. As an option, additional information about the malicious code is retrieved if an aspect of the malicious code is not recognized.

Another system, method and computer program product are provided for preventing an outbreak of malicious code. Accordingly, malicious code is identified at a local location on a network. Information relating to the malicious code is gathered at the local location and sent to a remote location utilizing the network. Such information includes a type, context, protocol, severity, reporting server, and/or source of the malicious code. Instances of the malicious code are blocked at the remote location is restricted.

In an aspect, the malicious code includes a virus, worm, and/or Trojan. Preferably, the instances are blocked at the remote location for a predetermined amount of time based on the information.

In another aspect, the information relating to the malicious code includes an identification of the source of the malicious code. Then, communications originating at the identified source are denied access to the remote locations for the predetermined amount of time. The source, file name, and/or checksum of the malicious code can be registered as a known threat. In yet another aspect, the malicious code is recognized based at least in part on recognizing that the source of the malicious code is registered as a known threat.

In a further aspect, countermeasures are executed for limiting the effect of the malicious code at the local location. As an option, additional information about the malicious code is retrieved if an aspect of the malicious code is not recognized.

A system, method and computer program product for denying access to a hacker is also provided according to one embodiment. An attack by a hacker is identified at a local location on a network. Information relating to the attack is encrypted at the local location. Such information can include a type, context, protocol, severity, reporting server, and/or IP address associated with the attack. The encrypted information relating to the attack is sent to a plurality of remote locations utilizing the network. Access to the remote locations is restricted for a predetermined amount of time based on the information.

In one aspect, an attack is detected on the network where an attempt to create a denial of service or any recognized form of hacking attempt is discovered. Preferably, the information relating to the attack includes an identification of the source of the attack and/or attacker, i.e., the server, IP address, etc. from or through which the hacker has attempted to gain unauthorized access to the system. Then, communications originating at the identified source are denied access to the remote locations for the predetermined amount of time. The source can be registered as a known threat. In another aspect, the attack is recognized based at least in part on recognizing that the source of the attack is registered as a known threat.

In a further aspect, countermeasures are executed for limiting the effect of the attack at the local location. As an option, additional information about the attack is retrieved if an aspect of the attack is not recognized.

In another system, method and computer program product, a method for denying access to a hacker is provided according to one embodiment. An attack by a hacker at a local location on a network is identified. Information relating to the attack at the local location is gathered and sent to a remote location utilizing the network. Access to the remote location is restricted. Again, the information can be a type, context, protocol, severity, reporting server, and/or source of the attack.

In an aspect, an attack is detected on the network where an attempt to create a denial of service or any recognized form of hacking attempt is discovered. Preferably, the information relating to the attack includes an identification of the source of the attack and/or attacker, i.e., the server, IP address, etc. from or through which the hacker has attempted to gain unauthorized access to the system. Then, communications originating at the identified source are denied access to the remote locations for the predetermined amount of time. The source can be registered as a known threat. In another aspect, the attack is recognized based at least in part on recognizing that the source of the attack is registered as a known threat.

In a further aspect, countermeasures are executed for limiting the effect of the attack at the local location. As an option, additional information about the attack is retrieved if an aspect of the attack is not recognized.

BRIEF DESCRIPTION OF THE DRAWINGS

FIG. 4 illustrates information relating to an attack identified in the method of FIGS. 3A and 3B.

DESCRIPTION OF THE PREFERRED EMBODIMENTS

Figure 1:
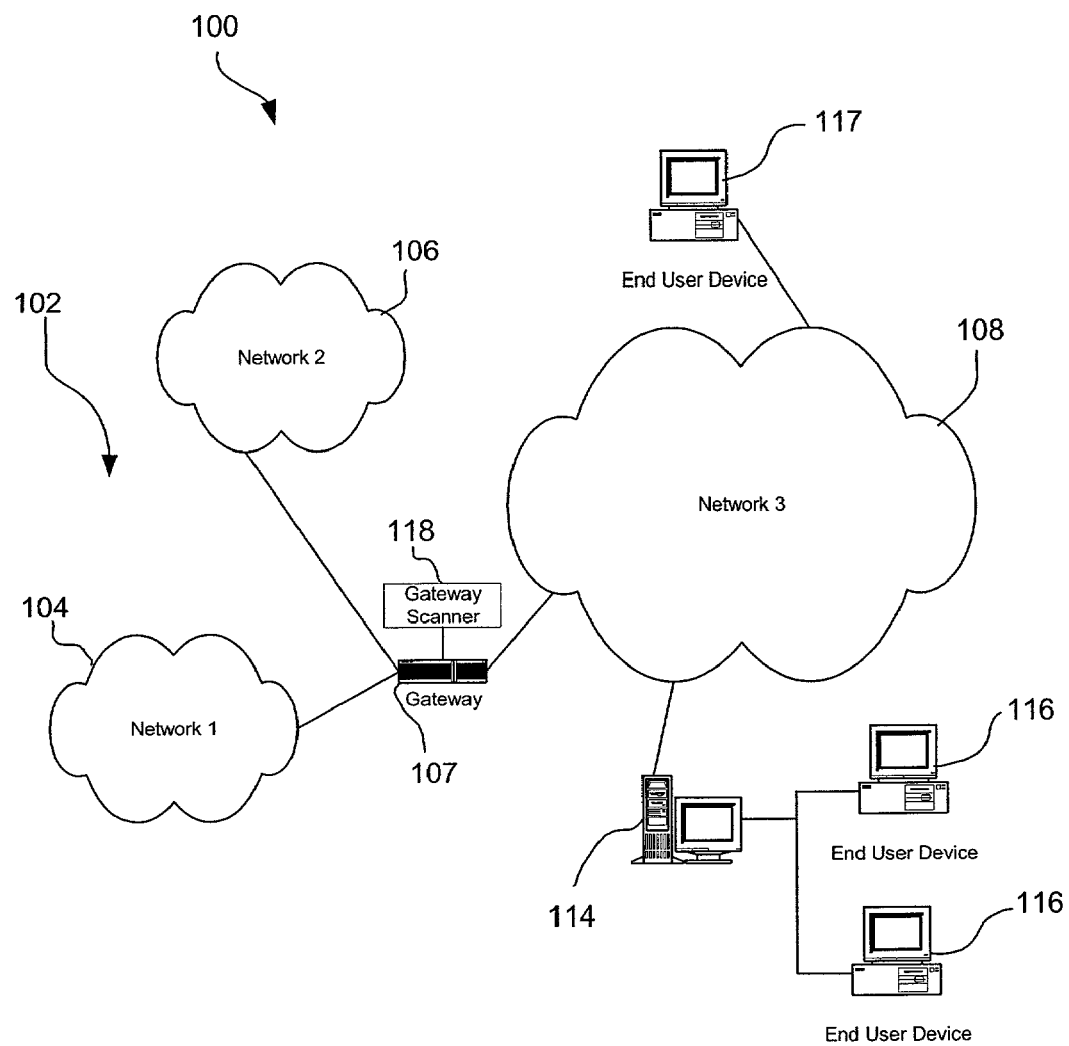
FIG. 1 illustrates a network architecture, in accordance with one embodiment.

FIG. 1 illustrates a network architecture 100, in accordance with one embodiment. As shown, a plurality of remote networks 102 are provided including a first remote network 104 and a second remote network 106. Also included is at least one gateway 107 coupled between the remote networks 102 and a proximate network 108. In the context of the present network architecture 100, the networks 104, 106 may each take any form including, but not limited to a local area network (LAN), a wide area network (WAN) such as the Internet, etc.

In use, the gateway 107 serves as an entrance point from the remote networks 102 to the proximate network 108. As such, the gateway 107 may function as a router, which is capable of directing a given packet of data that arrives at the gateway 107, and a switch, which furnishes the actual path in and out of the gateway 107 for a given packet.

Further included is at least one data server 114 coupled to the proximate network 108, and which is accessible from the remote networks 102 via the gateway 107. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 117 may also be directly coupled to any of the networks, in one embodiment.

Further provided is a gateway scanner 118 coupled to the gateway 107. It should be noted that additional scanners may be utilized with any type of network element coupled to the networks 104, 106. In the context of the present description, a network element may refer to any component of a network. In use, the scanner is capable of executing a scanning procedure. Details regarding such scanning procedure will be set forth hereinafter in greater detail.

Figure 2:
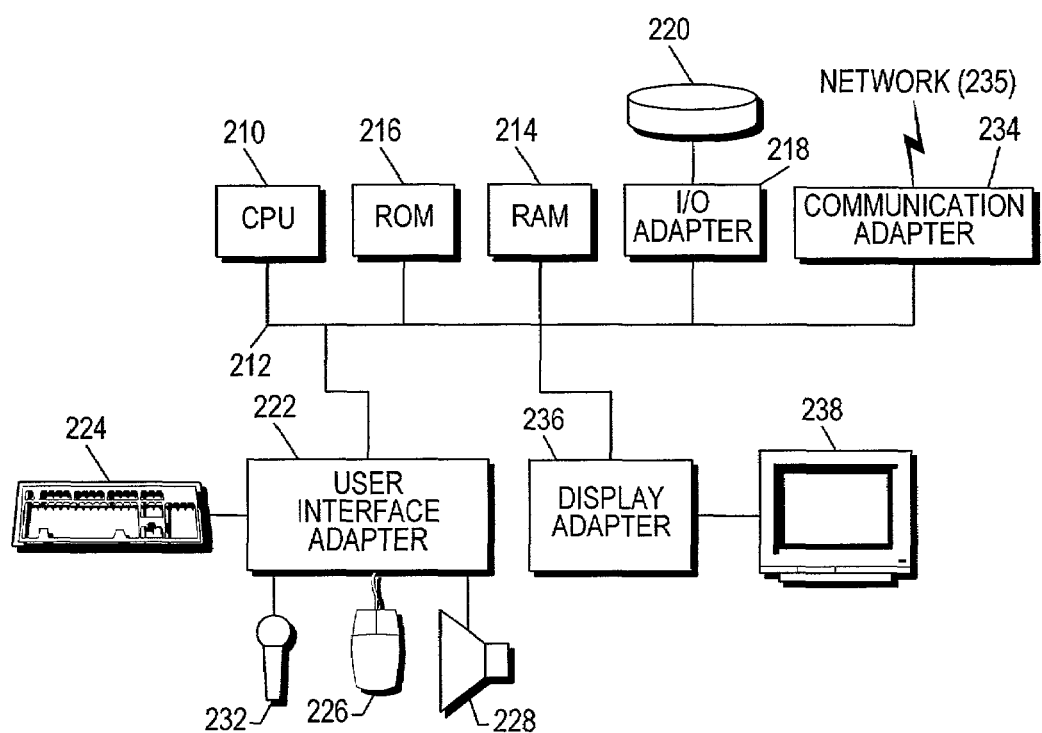
FIG. 2 shows a representative hardware environment that may be associated with the data servers and user devices of FIG. 1, in accordance with one embodiment.

FIG. 2 shows a representative hardware environment that may be associated with the data server 114 and user devices 116 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3A:
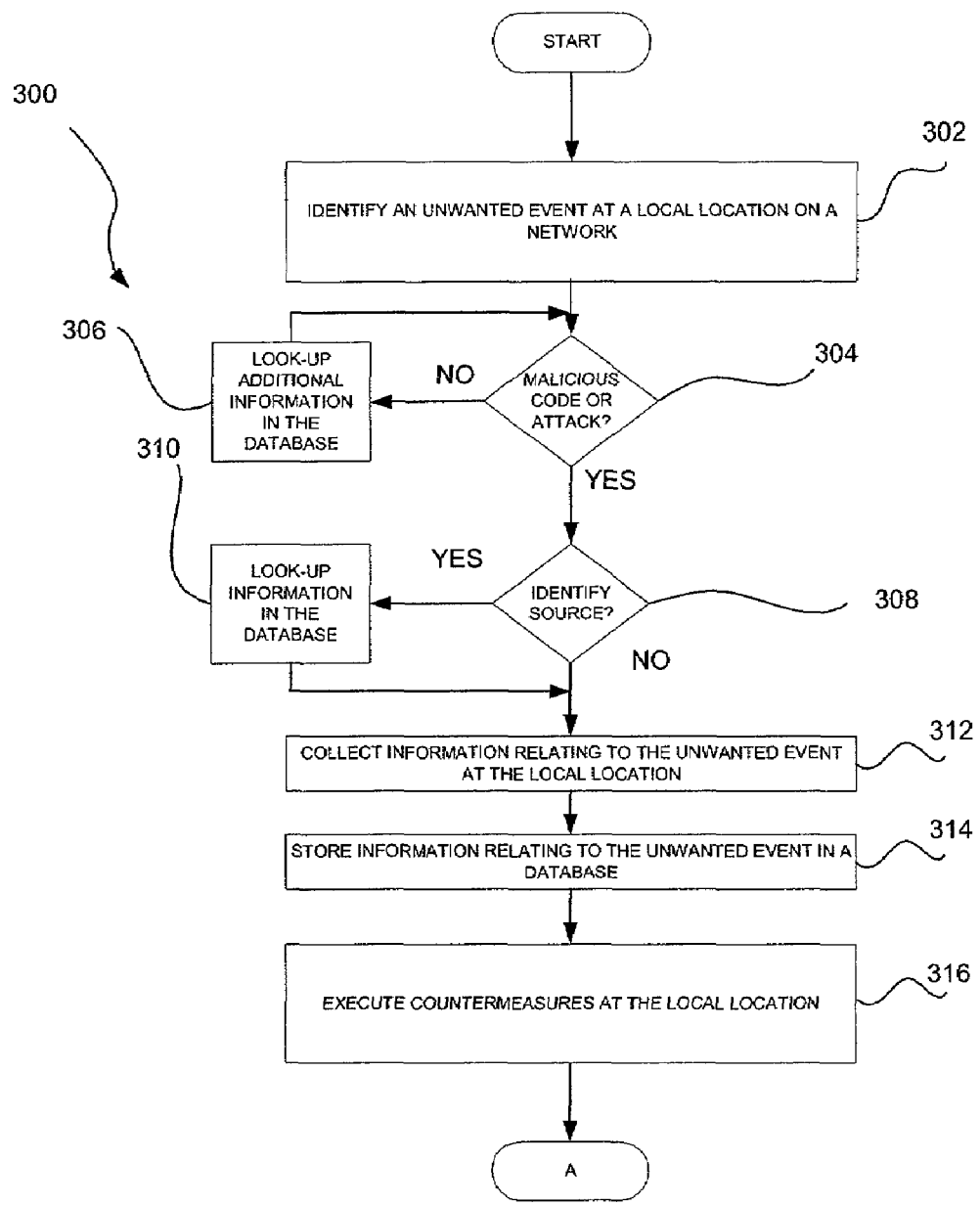
FIGS. 3A and 3B together illustrate a method for managing an outbreak of malicious code and denying access to a hacker according to one embodiment.
Figure 3B:
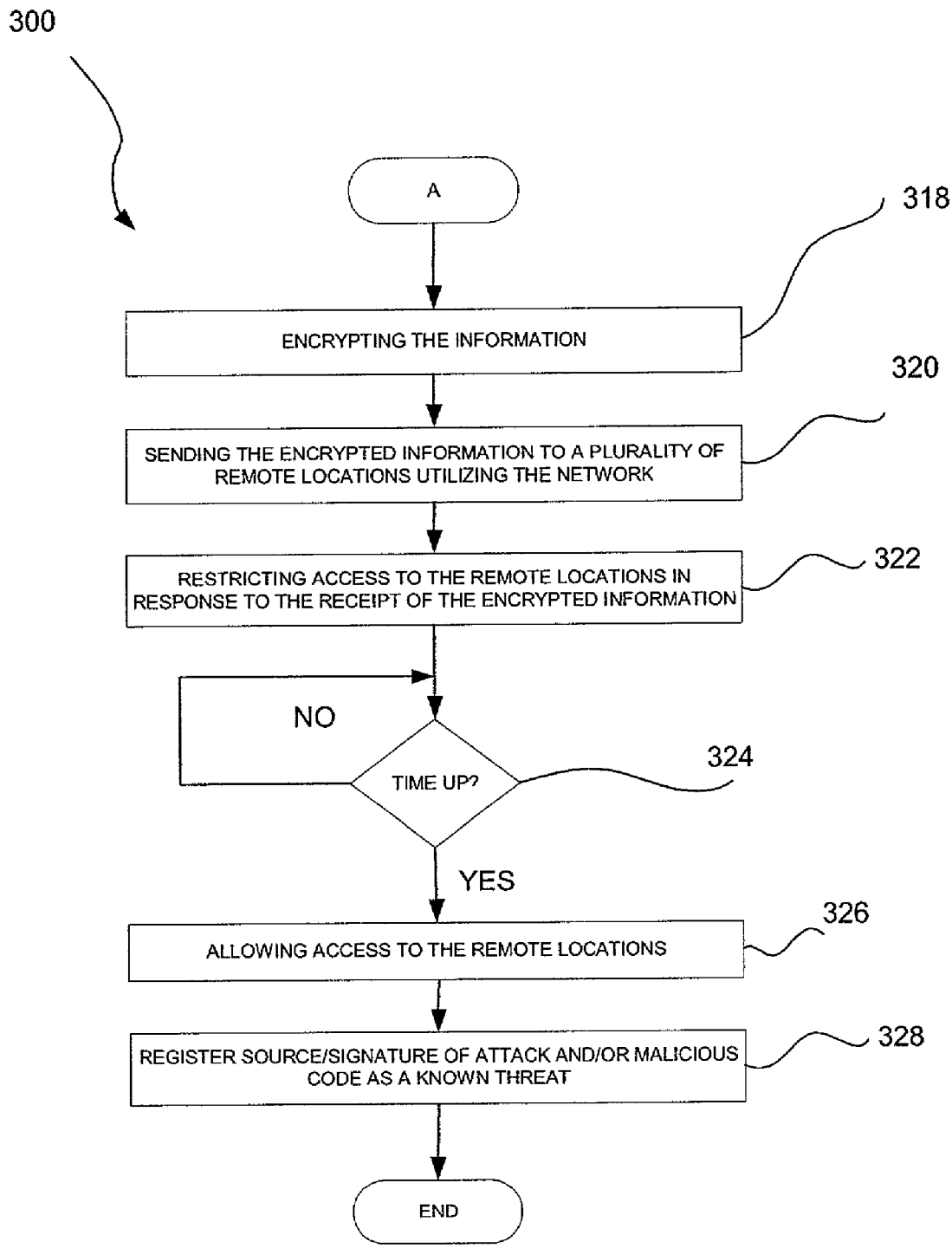

FIGS. 3A and 3B together illustrate a method 300 for managing an outbreak of malicious code and denying access to hacking attempts across a network, according to one embodiment of the present invention. In particular, this methodology allows network elements such as servers to collaborate in order to collectively lock out unwanted access to any given network. Where servers are in a vulnerable location, such as at the gateway to an organization, each would implement this "tell tale" method in order to relay important information about attempts to misuse their resource to other "tell-tale" servers across the network. This would have the effect of closing off access to such unauthorized users at other participating vulnerable servers, and therefore limiting the damage caused by such attempts.

As an option, the method 300 may be executed by the gateway scanner 118 coupled to the gateway 107 of FIG. 1.

It should be noted, however, that the method 300 may be executed by any desired network element.

Initially, in operation 302, an unwanted event at a local location is identified. One such unwanted event is an attack by a hacker. Attacks are likely to come from the outside, i.e. from a Hacker attempting to gain access, or trying to create a Denial of Service (DoS) on the server(s).

A denial of service is a means of attack against a computer, server or network. The attack may be an intentional or an accidental by-product of instruction code which is either launched from a separate network or Internet connected system, or directly at the host. The attack may be designed to disable or shutdown the target of the attack.

Another type of unwanted event is an outbreak or identification of malicious code. Malicious code includes any program that that performs or attempts to perform any unauthorized act. For example, one type of malicious code is a virus. A virus is a software program that self-replicates recursively. Viruses may damage data, cause the computer to crash, display messages, or lie dormant. Another type of malicious code is a worm, which is a virus that usually replicates using computer networks, such as via email or Internet Relay Chat (IRC). Yet another type is a Trojan, a program that either pretends to have, or is described as having, a set of useful or desirable features, but actually contains a damaging payload. Malicious code is preferably detected via a scanner such as an Anti Virus (AV) scanner by recognizing its file signature.

The unwanted event may be identified by recognizing a signature, file name, and/or checksum of the malicious code, by recognizing that code is being sent from a source already identified as a known threat, or in any other manner.

In operation 304, an attempt is made to recognize whether the unwanted event relates to an attack and/or malicious code. This preferably includes recognizing the type of attack and/or malicious code (virus, worm, Trojan, denial of service, etc.) and, for malicious code, can be performed using virus scan software commercially available.

If the event is recognized, the process continues. If the event is not recognized, additional information is retrieved from a database in operation 306 and used to recognize the event.

At 308, an attempt is made to identify the source of the attack and/or malicious code. If the source is identified, information (if any) about the source is retrieved from a database in operation 310. For example, the information can relate to whether the source is a known threat, i.e., is registered as having been a source of a prior attack.

In operation 312, information relating to the attack and/or malicious code is collected at the local location and stored in a database in operation 314. Such information 400 is shown by way of example in FIG. 4, and preferably includes one or more of the following: a type, context, protocol, severity, reporting network element, and/or source of the attack and/or the malicious code. The source can be identified by the IP address from which the attack and/or malicious code originated or any other identifying information.

In operation 316, countermeasures are executed in order to limit the damage caused in an outbreak condition to the local location, i.e., the server reporting the condition. Such countermeasures can include an outbreak management system which takes measures to prevent the spread of the malicious code or unauthorized access by closing communication channels and programs, as well as executing programming for removing the malicious code. Other participating servers quickly deny access to the source of the outbreak and thus maintain bandwidth within the organization.

The "tip off" information collected in operation 312 is encrypted using any suitable encryption method and sent to a plurality of remote locations utilizing the network to inform them of the attack and/or provide details of the attack. Note operations 318 and 320 of FIG. 3B. As an option, the information can include a certificate for allowing verification that the contents are trustworthy.

Various protocols can be supported for the information, including (but not limited to):
1. SMTP (tip-offs include SPAM attempts, SPAM-Relay attempts, Denial of Service (DoS) attacks, malicious attachment forwarding etc).
2. NNTP (tip-offs include DoS attacks, malicious attachment forwarding, cross-posting etc)
3. FTP (tip-offs include DoS attacks, repeated unsuccessful logins etc)
4. HTTP (tip-offs include malicious content, DoS attack, known hacking attempts)
5. Firewalls (tip-offs for intrusion detection, port scanning attempts etc).

In operation 322, access to the remote locations is restricted in response to the receipt of the encrypted information. Preferably, the access is restricted for a predetermined amount of time such as one hour, one day, one week, etc.; or for an indeterminate amount of time, such as until the attack is stopped, the source of the attack is identified, the scanning software has been updated with the signature of the malicious code, etc.

When a file is recognized as malicious-code (a virus, worm or Trojan), its file name, checksum, etc. can then be used to deny access to it at every point, rather than, or in addition to, its origin. For instance, one particular scanner at a mail gateway may identify BAD.EXE as a Trojan, at which point, it would tell other servers (a firewall, another MTA, an FTP server for instance) to deny 'BAD.EXE' for a period of time (in contrast to telling other servers to block IP address 151.121.221.1 for instance).

Upon determining that the amount of time has expired, access to the remote locations is allowed. Note operation 324 and 326.

The restriction can be full, denying all access to the remote locations, or partial. Preferably, only communications from the source of the attack are denied access to the local and remote locations to allow continued use of the network.

In operation 328, the source of the attack and/or malicious code is registered as a known threat and preferably stored in the database discussed above with respect to operation 310. The checksum and/or file name associated with the malicious code can also be registered as a known threat.

Figure 5:
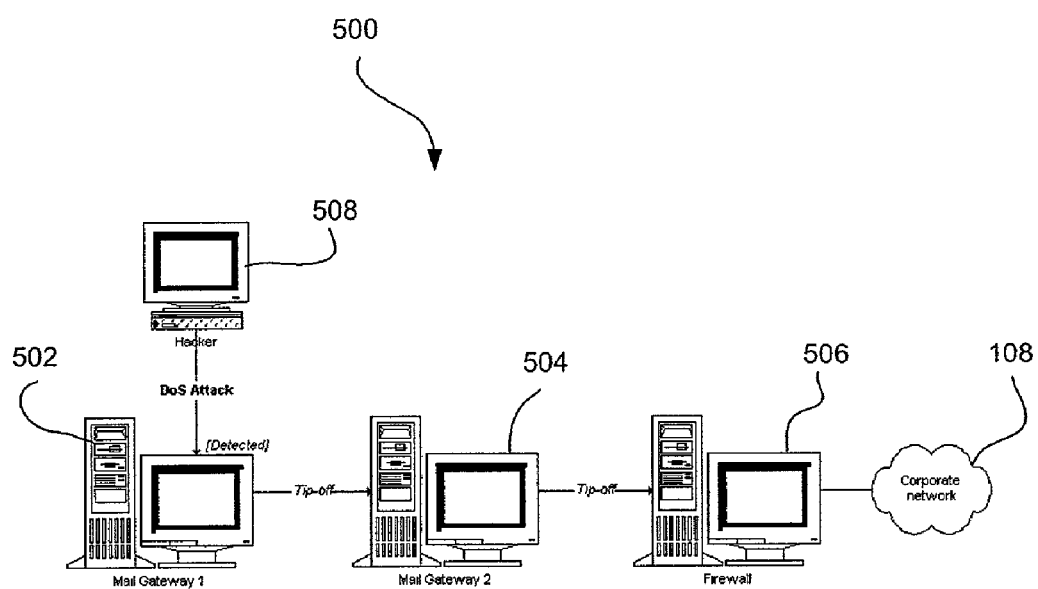
FIG. 5 depicts an intranet according to an illustrative embodiment of the present invention.

FIG. 5 depicts an intranet 500 according to an illustrative embodiment of the present invention. The intranet 500 includes several network elements: a first gateway 502 and a second gateway 504 in communication with each other. The second gateway 504 communicates with a firewall 506 of a network 108. Note that the gateways 502, 504 may be similar in operation and configuration as the gateway 107 described above in relation to FIG. 1. Each of the network elements is capable of acting upon information received by others.

In this example, a hacker 508 attempts access to the first gateway 502 for performing a Denial of Service (DoS) attack. The malicious code is detected at the first gateway 502, which preferably includes a gateway scanner 118 (see FIG. 1). Information relating to the attack, e.g., a tip-off, is sent to the other network elements, including the firewall 506 and the second gateway 504. For instance, if a DoS attack is detected at one network element within the organization, other participating gateways, firewalls and network elements can deny all access to the IP address of the source of the attack. This not only stops the given attack, but also registers a known threat from that IP address. Thus further attacks (of same or different nature) are identified and thwarted.

Figure 6:
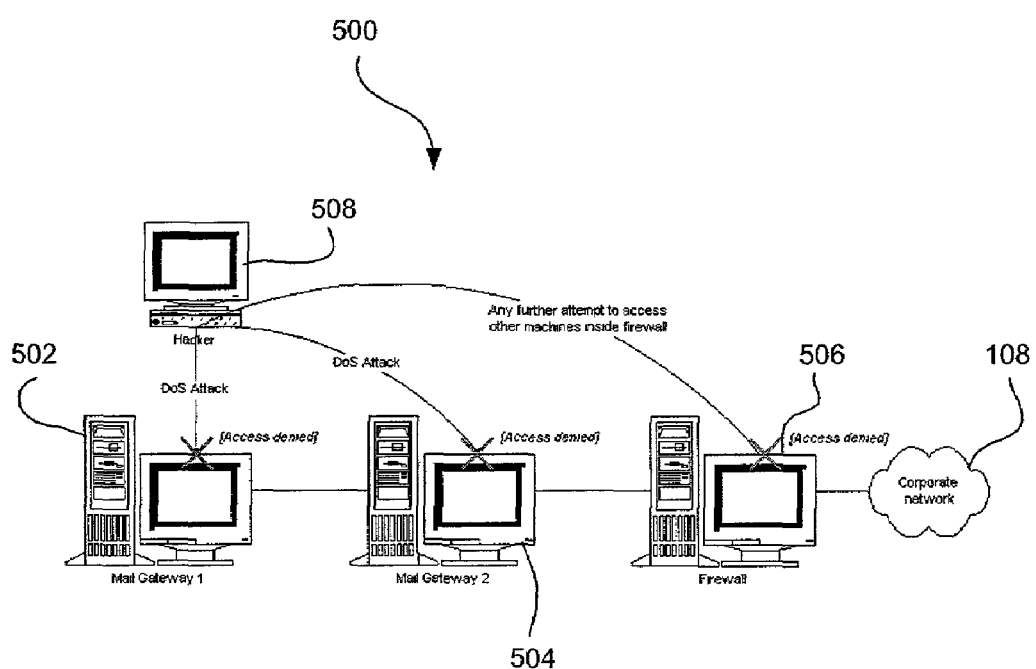
FIG. 6 depicts the intranet of FIG. 5 in the context of a subsequent attack by a hacker after a prior detected attack, according to an embodiment.

FIG. 6 depicts the intranet 500 of FIG. 5 in the context of a subsequent attack by the hacker in the previous example. As shown in FIG. 6, any subsequent attempt by the hacker to insert malicious code or gain unauthorized access to the network elements 502, 504, 506 is blocked. Nor could the hacker access the network 108. It is not uncommon for a hacker to try various means at entry to a company, and this approach takes a swift and secure action across all of the participating servers.

Figure 7:
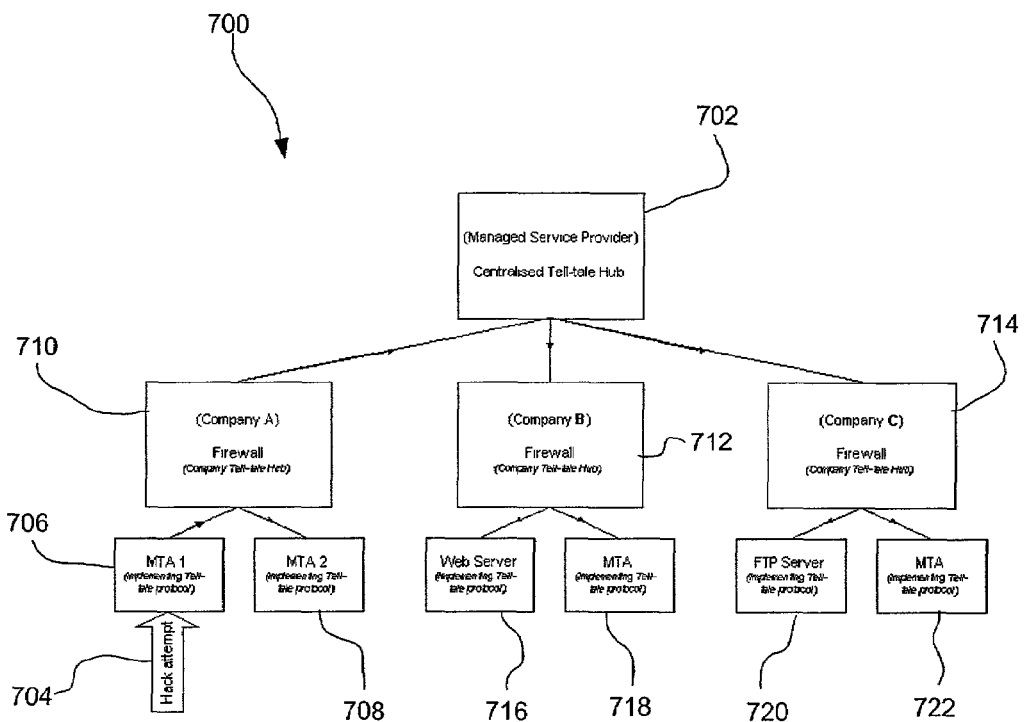
FIG. 7 illustrates a system for managed service utilizing a network, according to one embodiment.

FIG. 7 illustrates a system 700 for managed service utilizing a network, such as the Internet, company-wide intranet, LAN, etc., according to one illustrative embodiment. As shown, a managed service provider 702 acts as a trusted hub for tell-tale servers of participants. The managed service provider 702 receives attack and/or malicious code information from one participant and forwards it to other participants. Note that the following discussion will refer only to a hack attempt. One skilled in the art will understand that the discussion would apply equally to a malicious code situation.

For example, when a hack attempt 704 is recognized by a network element of Company A, here a gateway 706, information about the attack is sent to the other elements 708 of Company A via the Company A firewall 710, which acts as the hub for Company A.

The company hub 710 also sends the information to the managed service provider 702, which forwards the information to the hubs 712, 714 of other participants: Companies B and C in this example. The hubs each send the information to the network elements 716, 716, 720, 722 of the associated company.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for preventing an outbreak of malicious code, comprising:
   a) identifying malicious code at a local location on a network;
   b) encrypting information relating to the malicious code at the local location;
   c) sending the encrypted information relating to the malicious code to a plurality of remote locations utilizing the network; and
   d) blocking instances of the malicious code at the remote locations for a predetermined amount of time based on the information;
   e) registering at least one of a name and checksum of a file containing the malicious code as a known threat;
   f) wherein the information is selected from the group consisting of a type, context, protocol, severity, reporting server, and IP address associated with the malicious code;
   g) wherein the information relating to the malicious code includes an identification of the source of the malicious code, wherein communications originating at the identified source are denied access to the remote locations for the predetermined amount of time.

2. The method as recited in claim 1, wherein the malicious code is at least one of a virus, worm, and Trojan.

3. The method as recited in claim 1, further comprising executing countermeasures for limiting the effect of the malicious code at the local location.

4. The method as recited in claim 1, wherein additional information about the malicious code is retrieved if an aspect of the malicious code is not recognized.

5. A computer program product for managing an outbreak of malicious code, comprising:
   a) computer code for identifying malicious code at a local location on a network;
   b) computer code for encrypting information relating to the malicious code at the local location;
   c) computer code for sending the encrypted information relating to the malicious code to a plurality of remote locations utilizing the network; and
   d) computer code for blocking instances of the malicious code at the remote locations for a predetermined amount of time based on the information;
   e) computer code for registering at least one of a name and checksum of a file containing the malicious code as a known threat;
   f) wherein the information is selected from the group consisting of a type, context, protocol, severity, reporting server, and IP address associated with the malicious code;
   g) wherein the information relating to the malicious code includes an identification of the source of the malicious code, wherein communications originating at the identified source are denied access to the remote locations for the predetermined amount of time.

6. A system for preventing an outbreak of malicious code, comprising:
   a) logic for identifying malicious code at a local location on a network;
   b) logic for encrypting information relating to the malicious code at the local location;
   c) logic for sending the encrypted information relating to the malicious code to a plurality of remote locations utilizing the network; and
   d) logic for blocking instances of the malicious code at the remote locations for a predetermined amount of time based on the information;
   e) logic for registering at least one of a name and checksum of a file containing the malicious code as a known threat;
   f) wherein the information is selected from the group consisting of a type, context, protocol, severity, reporting server, and IP address associated with the malicious code;
   g) wherein the information relating to the malicious code includes an identification of the source of the malicious code, wherein communications originating at the identified source are denied access to the remote locations for the predetermined amount of time.

7. A method for denying access to a hacker, comprising:
 a) identifying an attack by a hacker at a local location on a network;
 b) encrypting information relating to the attack at the local location;
 c) sending the encrypted information relating to the attack to a plurality of remote locations utilizing the network; and
 d) restricting access to the remote locations for a predetermined amount of time based on the information;
 e) registering at least one of a name and checksum of a file associated with the attack as a known threat;
 f) wherein the information is selected from the group consisting of a type, context, protocol, severity, reporting server, and IP address associated with the attack;
 g) wherein the information relating to the attack includes an identification of the source of the attack, wherein communications originating at the identified source are denied access to the remote locations for the predetermined amount of time.

8. The method as recited in claim 7, wherein the attack attempts to create a denial of service.

9. The method as recited in claim 7, further comprising registering the source of the attack as a known threat.

10. The method as recited in claim 7, wherein the attack is recognized based at least in part on recognizing that the source of the attack is registered as a known threat.

11. The method as recited in claim 7, further comprising executing countermeasures for limiting the effect of the attack at the local location.

12. The method as recited in claim 7, wherein additional information about the attack is retrieved if an aspect of the attack is not recognized.

13. A computer program product for denying access to a hacker, comprising:
 a) computer code for identifying an attack by a hacker at a local location on a network;
 b) computer code for encrypting information relating to the attack at the local location;
 c) computer code for sending the encrypted information relating to the attack to a plurality of remote locations utilizing the network; and
 d) computer code for restricting access to the remote locations for a predetermined amount of time based on the information;
 e) computer code for registering at least one of a name and checksum of a file associated with the attack as a known threat;
 f) wherein the information is selected from the group consisting of a type, context, protocol, severity, reporting server, and IP address associated with the attack;
 g) wherein the information relating to the attack includes an identification of the source of the attack, wherein communications originating at the identified source are denied access to the remote locations for the predetermined amount of time.

14. A system for denying access to a hacker, comprising:
 a) logic for identifying an attack by a hacker at a local location on a network;
 b) logic for encrypting information relating to the attack at the local location;
 c) logic for sending the encrypted information relating to the attack to a plurality of remote locations utilizing the network; and
 d) logic for restricting access to the remote locations for a predetermined amount of time based on the information;
 e) logic for registering at least one of a name and checksum of a file associated with the attack as a known threat;
 f) wherein the information is selected from the group consisting of a type, context, protocol, severity, reporting server, and IP address associated with the attack;
 g) wherein the information relating to the attack includes an identification of the source of the attack wherein communications originating at the identified source are denied access to the remote locations for the predetermined amount of time.

15. A method for preventing an outbreak of malicious code, comprising:
 a) identifying malicious code at a local location on a network;
 b) wherein the malicious code is at least one of a virus, worm and, Trojan;
 c) wherein the malicious code is recognized based at least in part on recognizing that at least one of a checksum and a file name of the malicious code is registered as a known threat;
 d) encrypting information relating to the malicious code at the local location, wherein the information is selected from the group consisting of a type, context, protocol, severity, reporting server, and IP address associated with the malicious code, and wherein the information relating to the attack includes an identification of the source of the attack, wherein communications originating at the identified source are denied access to the remote locations for the predetermined amount of time;
 e) sending the encrypted information relating to the malicious code to a plurality of remote locations utilizing the network;
 f) restricting access to the remote locations by communications originating at the source of the malicious code for a predetermined amount of time based on the information;
 g) executing countermeasures for limiting the effect of the malicious code at the local location; and
 h) retrieving additional information about the malicious code if an aspect of the attack is not recognized.

16. The method as recited in claim 1, wherein the information includes a type, context, protocol, severity, reporting server, and IP address associated with the malicious code.

17. The method as recited in claim 16, wherein the type is selected from the group consisting of an unwanted message attempt, and a denial of service attack.

18. The method as recited in claim 16, wherein the context is selected from the group consisting of a virus name, a subject, a mail header, and a magic number for a message.

19. The method as recited in claim 1, further comprising attempting to identify a source of the malicious code, and, if the source is identified, retrieving information about the source from a database.

20. The method as recited in claim 1, wherein additional information relating to the malicious code is retrieved from a database if the malicious code is not identified in conjunction with an event at the local location on the network.

21. The method of claim 1, wherein a simple mail transfer protocol (SMTP) is utilized for collecting the information that is associated with spam attempts, spam-relay attempts, denial of service (DoS) attacks, and malicious attachment forwarding; a net news transfer protocol (NNTP) is utilized for collecting the information that is associated with DoS attacks, malicious attachment forwarding, and cross-posting; a file transfer protocol (FTP) is utilized for collecting the information that is associated with DoS attacks, and repeated unsuccessful logins; a hypertext transfer protocol (HTTP) is utilized for collecting the information that is associated with malicious content, DoS attacks, and known hacking attempts; and a firewall protocol is utilized for collecting the information that is associated with intrusion detection, and port scanning attempts.

* * * * *

UNITED STATES PATENT AND TRADEMARK OFFICE
CERTIFICATE OF CORRECTION

PATENT NO. : 7,007,302 B1 Page 1 of 1
APPLICATION NO. : 09/944869
DATED : February 28, 2006
INVENTOR(S) : Jagger et al.

It is certified that error appears in the above-identified patent and that said Letters Patent is hereby corrected as shown below:

Col. 10, line 11, change "attack" to --attack,--.

Signed and Sealed this

Twenty-seventh Day of May, 2008

JON W. DUDAS
*Director of the United States Patent and Trademark Office*